United States Patent Office 2,927,402
Patented Mar. 8, 1960

2,927,402

PROCESS FOR RENDERING SOIL RESISTANT TO EROSION WITH ASPHALTIC OIL-FREE PETROLEUM RESINOUS RESIDUE

Mayer B. Goren and Bobby Gene Marquardt, Oklahoma City, Okla., assignors to Kerr-McGee Oil Industries Inc., a corporation of Delaware No Drawing. Application February 21, 1956
Serial No. 566,772

18 Claims. (Cl. 47—58)

This invention relates to a process for treating soil and more particularly to an improved process for rendering soil resistant to wind and water erosion.

It is desirable in many instances to provide a treating material and a process for rendering soil resistant to erosion. Heretofore, others have proposed applying various types of continuous coatings to the soil to produce a protective coating over the soil surface of a paint-like character, but none of the prior proposals disclose the use of a soil treating material and process which will provide the soil with an erosion-resistant surface film and a consolidated erosion-resistant layer of soil beneath the film.

U.S. Patent No. 2,333,959, granted to Rollin J. Smith, discloses the use of a conventional asphaltic soil paint for use where the soil has been fertilized and seeded before application of the paint. A continuous coating of asphalt is applied to the soil surface and over the plants, roots, seed, etc., to form a temporary protective coating on the soil surface of such a nature as to permit the infiltration of water and oxygen through cracks which form naturally in the coating.

Prior art asphaltic coatings have not been entirely satisfactory in soil stabilization practices for a number of reasons. For example, since applied coating has been in the form of a paint-like coating covering the soil surface, it did not penetrate into the soil to any appreciable depth. Damage to the protective asphaltic coating, such as by traffic over the soil or by deterioration of the coating, and even cracks which form naturally in the film, result in only partial protection of the soil surface. The conventional bitumen cutbacks also have an adverse effect upon the germination of seeds in many instances if brought into direct or prolonged contact therewith. Thus seeding and application of the soil paint could not always be carried out successfully in one operation.

We have discovered that when soil is treated with a water emulsion of petroleum resinous residue, the soil acquires desirable properties which were not heretofore possible or, in some respects, contemplated by surface coatings of the prior art. Such emulsions, if applied in accordance with the invention, will provide soil with a continuous erosion-resistant surface film, and will penetrate to a depth sufficient to produce a continuous consolidated erosion-resistant layer of soil beneath the surface film. As an additional advantage, the tilth of the soil is improved.

Accordingly, it is a principal object of the present invention to provide an improved process for effectively stabilizing soil against erosion.

It is still a further object of the invention to provide an inexpensive process for effecting more permanent stabilization of soil against erosion and which will allow the treated soil to carry some vehicular traffic.

It is a further object of the invention to provide a process for improving the tilth of soil.

Still other objects of the invention will become apparent to those skilled in the art as the invention is better understood by reference to the detailed description appearing hereinafter.

The petroleum resinous residues suitable for treating soils in accordance with the invention are petroleum resins, asphaltenes, and mixtures thereof. The preferred petroleum resins have softening points between about 120° F. and 220° F. and are further characterized by an appreciable ductility for their softening points, while the preferred asphaltenes have softening points above 250° F. and are of a very friable nature. The petroleum resinous residues may be made by any of a number of suitable methods well known to the art and the manner of their preparation does not comprise a part of this invention. However, a preferred method for their preparation is described in copending U.S. patent applications Serial No. 435,944 filed June 10, 1954, and Serial No. 377,201, filed August 28, 1953 (both now abandoned). Petroleum resinous residues thus prepared are substantially oil-free.

In treating soils where wind and water erosion is a major problem, we emulsify the petroleum resinous residues, preferably to form a bitumen-in-water type emulsion and then apply this emulsion to the soil. A number of suitable methods for making butimen-in-water emulsions are known in the art, a preferred method being disclosed in U.S. patent application Serial No. 448,158, filed August 5, 1954, now abandoned in favor of Serial No. 541,026, filed October 17, 1955. The emulsions produced by the method disclosed in U.S. patent application Serial No. 448,158 are presently preferred due to their peculiar stability characteristics. Such emulsions have exceptional bulk stability, but in thin films the emulsions have a controlled stability which permits ready penetration into the soil before breaking to give a consolidated soil layer in a short period of time.

Emulsions prepared from petroleum resinous residues having lower softening points and higher ductilities are not adversely affected by seasonal weather changes after application to soil in accordance with the process of the invention. However, the higher softening point and lower ductility petroleum resinous residues, such as asphaltenes, should be plasticized with a suitable weather resistant non-volatile plasticizer and preferably before preparation of the emulsion. The preferred plasticizers are relatively non-volatile fluid hydrocarbons having boiling points between 500° F. and 1000° F., and viscosities below 120 seconds Furol at 210° F., preferably below 100 seconds Furol at 210° F. Specific examples of suitable fluid hydrocarbon plasticizers include gas oil and recycle oil from a catalytic cracker. The amount of plasticizer sufficient to properly plasticize petroleum resinous residue will vary between about 10% and 50% by weight depending upon the softening point and ductility of the particular petroleum resinous residue. Quantities of plasticizer as great as 10–20% by weight may be used in plasticizing petroleum resinous residue having a softening point of 150–250° F., while as much as 50% by weight plasticizer may be used in plasticizing asphaltenes having a softening point above 250° F. The plasticizer should be present in concentrations great enough to give the petroleum resinous residue substantial ductility.

Emulsions made by a suitable method described above and preferably containing from about 1 to 30% solids are uniformly applied by spraying or other suitable means and in such a manner as to coat the entire soil surface. The rate of application is preferably 0.2 to 1 gal. per sq. yd. or heavier, in most instances. The upper limit for the rate of application of emulsion is purely economic except where, as pointed out below, the depth of penetration is to be controlled. If shallow stabilization is desired, quantities as low as 0.05 gal. per sq. yd. may be applied. Such emulsions penetrate the soil and coat both the surface and sub-surface soil particles with a thin coating of petroleum resinous residue. Soil thus treated is given a very thin erosion-resistant surface film of petroleum resinous residue and, in addition, a consolidated layer of soil is formed with the petroleum resinous residue beneath this film, which layer is likewise erosion-resistant. It is apparent that the erosion-resistant qualities of soil treated by this method are not dependent entirely upon the surface film and, in fact, the surface film may be destroyed by deterioration or light traffic without appreciably affecting the resistance to erosion of the soil. The treated soil will remain erosion-resistant so long as at least a portion of the consolidated soil layer remains intact and provides a continuous protective layer for the subsoil. Thus a relatively permanent stabilization against erosion is achieved by the process of the invention as distinguished from the relatively temporary stabilization effected by the superficial coatings of the prior art.

The depth to which soil is consolidated by the foregoing treatment is dependent to some extent on the type of soil being treated and the moisture content of the soil. For example, a dry soil gives a lower penetration than a moist or very wet soil. The depth of penetration of the emulsion and consolidation of the soil is also influenced by the percentage of solids in the treating emulsion and the rate of application. If it is desired to consolidate the soil to a depth of from ½ to 1 inch, the emulsion may contain 1–5% solids and may be applied at the rate of 0.5–1 gal. per sq. yd. on most soils, or at a higher rate of application if a greater depth, such as 2 to 2½ inches, is desired. A higher solid content emulsion may be used when a relatively thick surface film and shallower consolidation of the soil is desired, or where somewhat deeper penetration is desired and the soil is very moist or wet. The higher solid content emulsions give better results when used in treating highly porous or sandy-type soils than when used in treating tight or clayey-type soils.

One important advantage of using a bitumen-in-water type emulsion of petroleum resinous residue rather than a conventional asphaltic cutback is that seed may be mixed with the emulsion without adverse effect upon their germination. Thus the soil stabilization treatment and seeding may be carried out simultaneously in one operation. This variation of our process is highly desirable for use in permanently stabilizing road shoulders, floodways, etc. since the treatment will permit the seeds to sprout and emerge through the erosion-resistant soil. The surface film and consolidated soil layer will offer sufficient resistance to wind and water erosion to maintain a desired surface contour until a proper sod is obtained from the seeded plants.

Another variant of our process for treating soils is of importance in normal agricultural practices in the more arid sections of the country where wind and dust erosion, commonly called weather beating, destroys large acreages of young plants each year. Under such conditions we treat the seed bed behind a seeder, such as an oat or wheat drill, with a thin coating of letdown emulsion sufficient to stabilize the soil against wind and water erosion until such time as the plants are able to produce a strong root system. This treatment will prevent weather beating of the young plants and also conserve moisture to some extent.

The following specific example is for the purpose of illustrating the invention and is not limited to the scope thereof which is set forth in the appended claims:

Example

A bitumen-in-water type emulsion of petroleum resinous residue was made in accordance with the teachings of copending patent application (now abandoned) Serial No. 448,158, filed August 5, 1954. This emulsion was let down to 2–6% solids and then applied to road shoulders of a sandy to loamy type at the rate of 0.2 to 1 gal. per sq. yd. This treatment was made during winter months to prevent erosion of the soil when a sod of plants could not be readily grown. The soil thus treated was examined and found to have a tough erosion-resistant film at its surface and then a consolidated layer of soil beneath this film of a depth from ¼ to 1 inch, the depth of the consolidated layer depending upon the amount of emulsion applied per square yard and the moisture content of the soil when treated. It was also observed that light traffic sufficient to destroy the surface film did not appreciably affect the erosion-resistant qualities of the soil since the consolidated layer was likewise effective in preventing erosion. There was no noticeable erosion on the treated shoulders during the winter months, while similar untreated shoulders eroded badly. It was further observed that the surface film was of such a nature as to allow penetration of water and air directly into the soil despite the fact that no cracking, scaling, or other deterioration of the surface film was noted.

The treated road shoulders were lightly cultivated several months later for the purpose of preparing a seed bed and then a letdown emulsion (5% solids) as above prepared and containing a suitable amount of seed was applied at the rate of 0.5 gal. per sq. yd. This treatment consolidated the fresh soil layer to a depth of about ¼–½ inch, yet permitted the seeds to sprout in the consolidated soil layer and emerge through the erosion-resistant surface film. Untreated shoulders were also seeded at the same time.

Observation of the treated seeded areas and untreated areas showed the treatment to be highly effective in preventing wind and water erosion. The treated soil was not subject to noticeable wind and water erosion during the period required for growing a sod and maintained the desired surface contour. The untreated soil eroded badly during this period.

The foregoing description of the present invention is for the purpose of illustration only and is not limiting to the scope thereof which is set forth in the claims.

What is claimed is:

1. A process for stabilizing soil against erosion comprising treating the soil with a substantially asphaltic oil-free petroleum resinous residue-in-water emulsion to form a continuous erosion-resistant film of petroleum resinous residue on the soil surface and a continuous erosion-resistant consolidated soil layer beneath the film.

2. A process for stabilizing soil against erosion comprising treating the soil with a substantially asphaltic oil-free asphaltene-in-water emulsion to form a continuous erosion-resistant film of asphaltenes on the soil surface and a continuous erosion-resistant consolidated soil layer beneath the film.

3. A process for stabilizing soil against erosion comprising treating the soil with a substantially asphaltic oil-free petroleum resin-in-water emulsion to form a continuous erosion-resistant film of petroleum resin on the soil surface and a continuous erosion-resistant consolidated soil layer beneath the film.

4. A process for stabilizing soil against erosion comprising treating the soil with a substantially asphaltic oil-free petroleum resinous residue-in-water emulsion containing from 1–30% solids by weight to form a continuous erosion-resistant film of petroleum resinous residue on the surface and a continuous erosion-resistant soil layer consolidated by the petroleum resinuous residue beneath the film.

5. A process for stabilizing soil against erosion comprising treating the soil with a substantially asphaltic oil-free asphaltene-in-water emulsion containing from 1–30% solids by weight to form a continuous erosion-resistant film of asphaltenes on the soil surface and a continuous erosion-resistant soil layer consolidated by the asphaltenes beneath the film.

6. A process for stabilizing soil against erosion comprising treating the soil with a substantially asphaltic oil-free petroleum resin-in-water emulsion containing from 1–30% solids by weight to form a continuous erosion-resistant film of petroleum resins on the soil surface and a continuous erosion-resistant soil layer consolidated by the petroleum resin beneath the film.

7. A process for stabilizing soil against erosion comprising treating the soil with a water emulsion of a substantially asphaltic oil-free petroleum resinous residue plasticized with 0.5 to 5% by weight of a fluid non-volatile hydrocarbon boiling above 500° F. to form a continuous erosion-resistant film of petroleum resinous residue on the soil surface and a continuous erosion-resistant consolidated soil layer beneath the film.

8. The process of claim 7 wherein the water emulsion contains from 1 to 30% solids.

9. A process for permanently stabilizing soil against erosion comprising treating the soil with a substantially asphaltic oil-free petroleum resinous residue-in-water type emulsion containing desired seed therein.

10. A process for permanently stabilizing soil against erosion comprising treating the entire surface of the soil with a substantially aliphatic oil-free petroleum resinous residue-in-water type emulsion diluted to 1 to 30% by weight petroleum resinous residue and containing desired seed therein.

11. A process for permanently stabilizing soil against erosion comprising treating the entire surface of the soil with a substantially asphaltic oil-free asphaltene-in-water emulsion diluted to 1 to 30% by weight asphaltene and containing desired seed therein.

12. A process for permanently stabilizing soil against erosion comprising treating the entire surface of the soil with a substantially asphaltic oil-free resin-in-water emulsion diluted to 1 to 30% by weight petroleum resins and containing desired seed therein.

13. A composition for permanently stabilizing soil against erosion comprising substantially asphaltic oil-free petroleum resinous residue-in-water emulsion diluted to 1 to 30% by weight petroleum resinous residue and containing desired seed therein.

14. The composition of claim 13 wherein the petroleum resinous residue is asphaltenes.

15. The composition of claim 13 wherein the petroleum resinous residue is petroleum resins.

16. A composition for stabilizing soil against erosion comprising substantially asphaltic oil-free petroleum resinous residue-in-water emulsion containing desired seed therein.

17. The composition of claim 16 wherein the petroleum resinous residue is asphaltenes.

18. The composition of claim 16 wherein the petroleum resinous residue is petroleum resins.

References Cited in the file of this patent

Publications: Myers et al., "Some Experiences with Asphalt," published 1941 in Soil Science Society of America Proceedings 1941, vol. 6, pages 459, 460, 461.

Hackh's Chemical Dictionary, third edition, published 1944, page 80.

Wells: "New Horticultural Methods," published Oct. 1947 in Roads and Streets (magazine), vol. 90, No. 10, pages 89, 90, 113.

Lentz: "How to Grow Grass on Roadsides," published Apr. 1949 in Public Works (magazine), vol. 80, No. 4, pages 30, 31, 32.

Condenser Chemical Dictionary, fourth edition, published 1950 by Reinhold (N.Y.), pages 566 and 567.

Garmhausen: "Asphalt Mulch," published Feb. 1951 in Roads and Streets (magazine), vol. 94, No. 2, pages 80 through 86.

Davis: "Krilium for Crops," published January 1952 in "Chemistry" (magazine), vol. 25, No. 5, pages 1 through 8.

Contractors and Engineers (magazine), published April 1953, vol. 50, No. 4, pages 134 through 137. Article, "Mulching Practices in Seeding Roadsides."

H. M. Smith: "The Effect of Asphalt Mulches on the Stabilization of Soils and Aggregate Materials and on Vegetational Cover," published before Aug. 19, 1953 as an Abstract of a Thesis, at University of Illinois, Urbana, Illinois. Eight pages.

UNITED STATES PATENT OFFICE

CERTIFICATE OF CORRECTION

Patent No. 2,927,402                                    March 8, 1960

Mayer B. Goren et al.

It is hereby certified that error appears in the printed specification of the above numbered patent requiring correction and that the said Letters Patent should read as corrected below.

Column 3, line 70, for "limited" read -- limiting --; column 5, line 27, for "aliphatic" read -- asphaltic --.

Signed and sealed this 13th day of December 1960.

(SEAL)
Attest:

KARL H. AXLINE
Attesting Officer

ROBERT C. WATSON
Commissioner of Patents